US006928534B2

(12) United States Patent
Yeluri

(10) Patent No.: US 6,928,534 B2
(45) Date of Patent: Aug. 9, 2005

(54) FORWARDING LOAD DATA TO YOUNGER INSTRUCTIONS IN ANNEX

(75) Inventor: Sharada Yeluri, San Jose, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 611 days.

(21) Appl. No.: 10/081,248

(22) Filed: Feb. 22, 2002

(65) Prior Publication Data

US 2003/0163673 A1 Aug. 28, 2003

(51) Int. Cl.⁷ .................................................. G06F 9/38
(52) U.S. Cl. ...................................... 712/225; 712/217
(58) Field of Search .............................. 712/225, 217, 712/218, 219, 245

(56) References Cited

U.S. PATENT DOCUMENTS

| | | | | |
|---|---|---|---|---|
| 5,748,935 A | * | 5/1998 | Tremblay et al. ........... 712/216 |
| 5,878,245 A | | 3/1999 | Johnson et al. ............. 395/481 |
| 5,887,152 A | * | 3/1999 | Tran ............................ 712/217 |
| 5,898,854 A | * | 4/1999 | Abramson et al. .......... 712/218 |
| 6,389,529 B1 | * | 5/2002 | Arimilli et al. ............. 712/225 |
| 6,618,803 B1 | * | 9/2003 | Hannum et al. ............ 712/225 |

\* cited by examiner

*Primary Examiner*—Henry W. H. Tsai
(74) *Attorney, Agent, or Firm*—Zagorin O'Brien Graham LLP

(57) ABSTRACT

A method and computer system for bypassing load data to younger instructions are provided. The method and computer system contemplate a microprocessor that manages interlock conditions for load instructions and that supports speculative and out-of-order execution of load instructions. A freshest value for a source register is located among the entries of a load annex and one or more non-load annexes. The contents of the freshest value is bypassed to a current instruction for execution.

15 Claims, 6 Drawing Sheets

| CYCLE | 1 | 2 | 3 | 4 | 5 | 6 | 7 | 8 | 9 | 10 | 11 | 12 |
|---|---|---|---|---|---|---|---|---|---|---|---|---|
| (1) | D | E | C/A1 | A2 (Idx1) | A3 (Idx2) | T (Idx3) | WB (Idx4) | | | | | |
| (2) | | D | D | D | E | A1 | A2 | A3 | T | WB | | |
| (3) | | | | | D | E | A1 | A2 | A3 | T | WB | |
| (4) | | | | | | D | E | A1 | A2 | A3 | T | WB |
| (5) | | | | | | | D | E | A1 | A2 | A3 | T |
FIG. 9
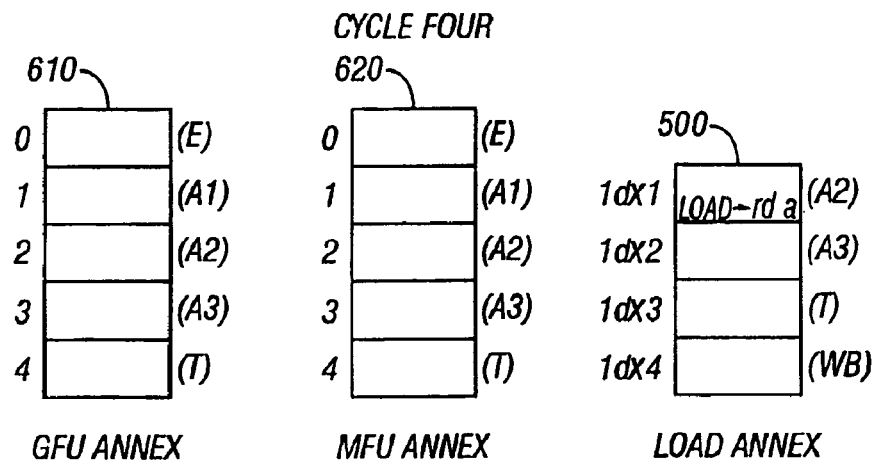
FIG. 10
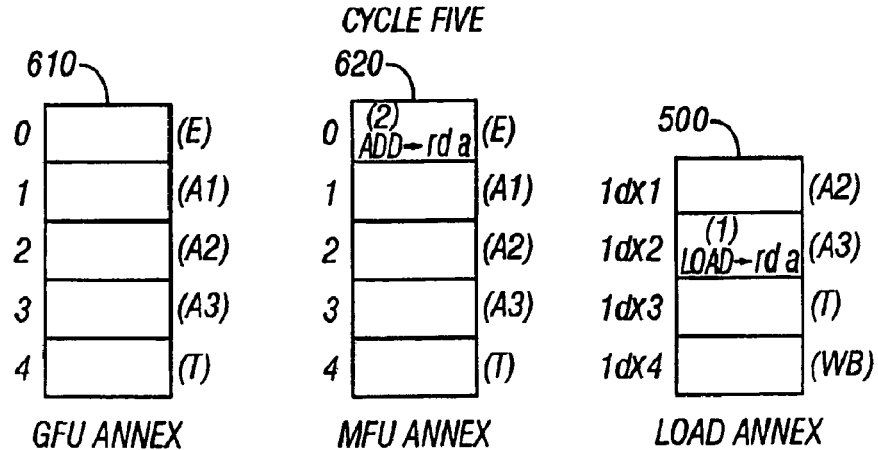
FIG. 11

FORWARDING LOAD DATA TO YOUNGER INSTRUCTIONS IN ANNEX

BACKGROUND OF THE INVENTION

1. Field of the Invention

The present invention relates to computing devices and, more particularly, to an apparatus and method for forwarding or "bypassing" load data to younger instructions while the load data is staged in an annex.

2. Description of the Related Art

In multiple-thread processing, an automated system for various processing applications may handle multiple events or processes concurrently. A single process is termed a thread of control, or "thread," and is the basic unit of operation of independent dynamic action within the system. A program has at least one thread. A system performing concurrent operations typically has many threads, some of which are transitory, while others are enduring. Systems that execute among multiple processors allow for true concurrent threads. Single-processor systems can only have illusory concurrent threads, typically attained by time-slicing of processor execution, shared among a plurality of threads.

Some programming languages are particularly designed to support multiple-threading. One such language is the Java™ programming language that is advantageously executed using an abstract computing machine, the Java Virtual Machine™. A Java Virtual Machine™ is capable of supporting multiple threads of execution at one time. The multiple threads independently execute Java code that operates on Java values and objects residing in a shared main memory. The multiple threads may be supported using multiple hardware processors, by time-slicing a single hardware processor, or by time-slicing many hardware processors. In 1990 programmers at Sun Microsystems, Inc. developed a universal programming language, eventually known as "the Java™ programming language." Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

SUMMARY OF THE INVENTION

A method and computer system are provided. In a microprocessor that manages interlock conditions for load instructions and that supports speculative and out-of-order execution of load instructions, a method of bypassing data to younger instructions comprises identifying a source register upon whose contents a current instruction depends for execution. The method further comprises providing a load annex that has a plurality of sequential load entries and storing a plurality of load data in the sequential entries of the load annex. Each of the plurality of sequential load entries in the load annex are capable of storing data associated with the source register, wherein each load entry is associated with one of a plurality of sequential priority levels, the plurality of sequential priority levels comprising a highest priority level and a lowest priority level. The plurality of load data stored in the sequential entries of the load annex are associated with a particular register, wherein the plurality of load data associated with a particular register are stored in program order with respect to each other. The method further comprises providing a non-load annex having a plurality of non-load entries. Each of the plurality of non-load entries is capable of storing data associated with the source register. Each entry of the non-load annex is associated with one of the sequential priority levels. The method further comprises providing that, at most, only one among the load entry associated with a particular priority level and the non-load entry associated with the particular priority level contains a value associated with the source register. The method further comprises locating a freshest value and providing the freshest value for use in execution of the current instruction. Locating the freshest value comprises locating, among the plurality of load annex entries and the plurality of non-load annex entries, a freshest value associated with the source register.

A computer system that bypasses load data to younger instructions is also provided. The computer system comprises a main memory, at least one processing unit coupled to the main memory, a load annex, a scoreboard, a non-load annex, a module that provides for locating a freshest value, and a module that is operable to provide the freshest value for use in execution of a current instruction. The at least one processing unit is configured to execute load instructions and is also configured to execute the current instruction, wherein the current instruction has a source register. The load annex has a plurality of sequential load entries. Each of the plurality of sequential load entries is capable of storing data associated with the source register, wherein each load entry is associated with one of a plurality of sequential priority levels. The plurality of sequential priority levels comprises a highest priority level and a lowest priority level. The scoreboard manages interlock conditions for the load instructions executed by the processing unit. The scoreboard further comprises a module that permits execution of a plurality of load instructions having the same destination register, wherein the plurality of load instructions having the same destination register are executed in program order with respect to each other. The non-load annex has a plurality of non-load entries, each of the plurality of non-load entries being capable of storing data associated with the source register. Each entry of the non-load annex is associated with one of the plurality of sequential priority levels. The module that provides for locating a freshest value further comprises a module, coupled to the main memory, that provides for locating, among the plurality of load annex entries and the plurality of non-load annex entries, a freshest value associated with the source register.

Another embodiment of a computer system comprises a main memory, at least one processing unit coupled to the main memory, means for identifying a source register upon whose contents a current instruction depends for execution, means for storing a plurality of load data associated with the source register, means for storing a plurality of load data associated with a particular register in program order with respect to each other, and means for storing a plurality of non-load data associated with the source register, wherein each non-load data is associated with one of a plurality of sequential priority levels. The at least one processing unit is configured to execute load instructions and is also configured to execute a current instruction having a source register. Each of the load data is associated with one of the plurality of sequential priority levels, the plurality of sequential priority levels comprising a highest priority level and a lowest priority level. The computer system further comprises a means for providing that, at most, only one among the load data associated with a particular priority level and the non-load data associated with the particular priority level contains a value associated with the source register. The method further comprises means for locating, among the plurality of load data and the plurality of non-load data, a freshest value associated with the source register. The method further comprises means for providing the freshest value for use in execution of the current instruction.

BRIEF DESCRIPTION OF THE DRAWINGS

The present invention may be better understood, and its numerous objects, features, and advantages made apparent to those skilled in the art by referencing the accompanying drawings.

FIG. 9 is a diagram illustrating the pipeline stages for successive instructions in an instruction stream.

FIG. 10 is a block diagram illustrating the storage of load data in a load annex.

FIG. 11 is a block diagram illustrating the contents of an MFU annex containing data corresponding to non-load instruction and the contents of a load annex containing data corresponding to a load instruction having the same destination register.

The use of the same reference symbols in drawings indicates identical items unless otherwise noted.

DETAILED DESCRIPTION

Figure 1:
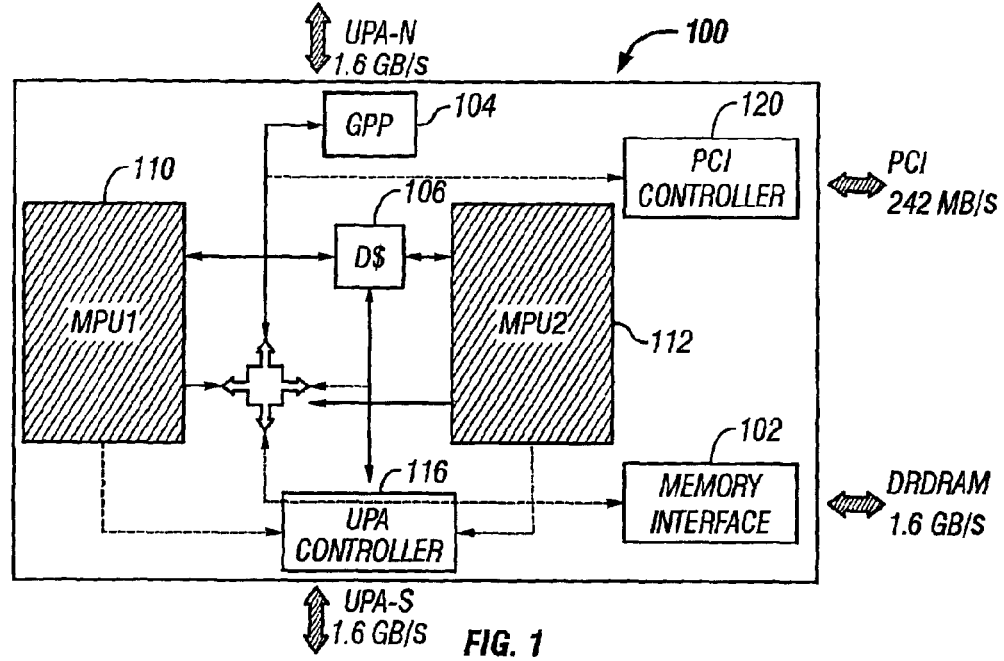
FIG. 1 is a schematic block diagram illustrating one embodiment of a multiple-thread processor.

Referring to FIG. 1, a schematic block diagram illustrates a processor 100 having an improved architecture for multiple-thread operation on the basis of a highly parallel structure including multiple independent parallel execution paths, shown herein as two media processing units 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language, generates two threads that respectively execute in the two parallel execution paths with very little overhead incurred. The special instructions executed by the multiple-threaded processor 100 include instructions for accessing arrays and instructions that support garbage collection.

A single integrated circuit chip implementation of a processor 100 includes a memory interface 102 for interfacing with a main memory, a geometry decompressor 104, the two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually and closely linked to the processor core with high bandwidth, low-latency communication channels to manage multiple high-bandwidth data streams efficiently and with a low response time. The interface controllers include an UltraPort Architecture Interconnect (UPA) controller 116 and a Peripheral Component Interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The shared data cache 106 allows fast data sharing and eliminates the need for a complex, error-prone cache coherency protocol between the media processing units 110 and 112.

The processor 100 issues and retires instructions in order. However, processor 100 implements dynamic instruction rescheduling and speculative execution of load instructions, which allows instructions to execute and complete out of order. Even though the operations may finish out of order, and therefore may generate exceptions out of order, the processor 100 nonetheless provides precise trap handling and maintains the appearance of in-order execution following a trap.

Figure 2:
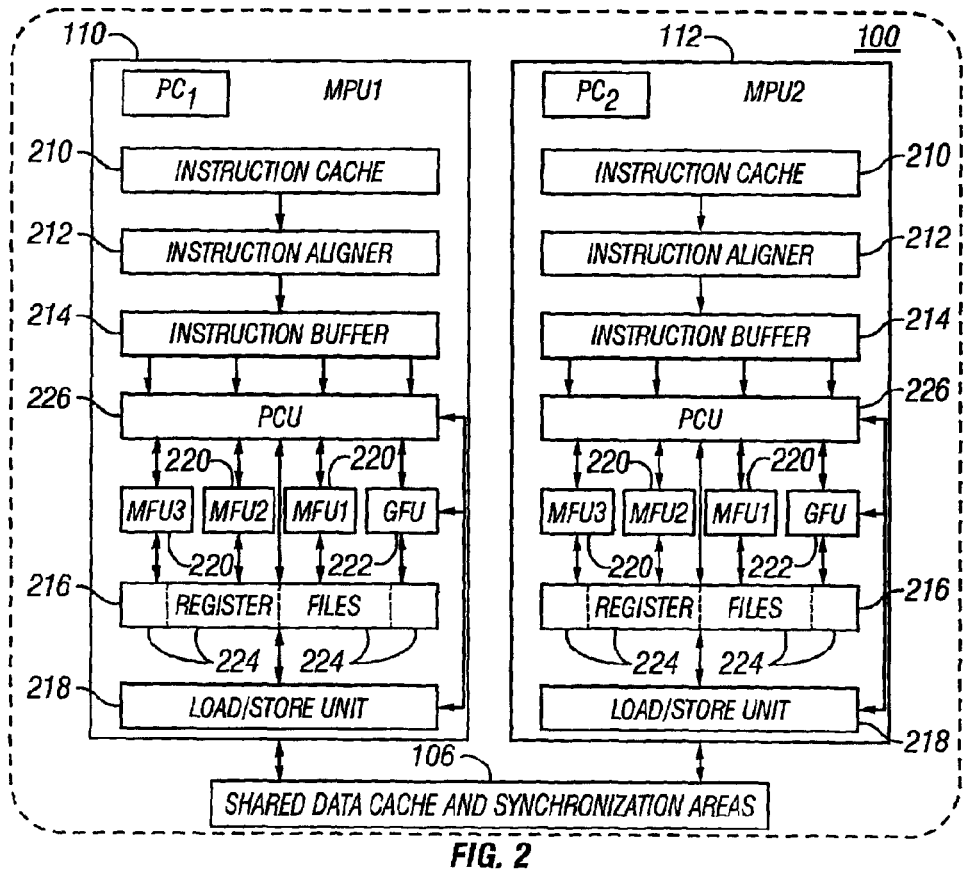
FIG. 2 is a schematic block diagram showing the core of one embodiment of a multi-thread processor.

Referring to FIG. 2, a schematic block diagram shows the core of the processor 100. The media processing units 110 and 112 each include an instruction cache 210, an instruction aligner 212, an instruction buffer 214, a pipeline control unit (PCU) 226, a split register file 216, a plurality of functional units, and a load/store unit 218. In the illustrative processor 100, the media processing units 110 and 112 use a plurality of functional units for executing instructions. The functional units for a media processing unit 110 include three media functional units (MFU) 220 and one general functional unit (GFU) 222.

An individual independent parallel execution path 110 or 112 has operational units including instruction supply blocks and instruction preparation blocks, functional units 220 and 222, and a register file 216 that are separate and independent from the operational units of other paths of the multiple independent parallel execution paths. The instruction supply blocks include a separate instruction cache 210 for the individual independent parallel execution paths, however the multiple independent parallel execution paths share a single data cache 106 since multiple threads sometimes share data. The data cache 106 is dual-ported, allowing data access in both execution paths 110 and 112 in a single cycle. Sharing of the data cache 106 among independent processor elements 110 and 112 advantageously simplifies data handling, avoiding a need for a cache coordination protocol and the overhead incurred in controlling the protocol.

In addition to the instruction cache 210, the instruction supply blocks in an execution path include the instruction aligner 212 and the instruction buffer 214 that precisely format and align a full instruction group of four instructions to prepare to access the register file 216. An individual execution path has a single register file 216 that is physically split into multiple register file segments 224, each of which is associated with a particular functional unit of the multiple functional units. At any point in time, the register file segments 224, as allocated to each functional unit, each contain the same content. A multi-ported register file is typically metal limited to the area consumed by the circuit, which is proportional with the square of the number of ports. The processor 100 has a register file structure 216, which is divided into a plurality of separate and independent register files to form a layout structure with an improved layout efficiency. The read ports of the total register file structure 216 are allocated among the separate and individual register files. Each of the separate and individual register files has write ports that correspond to the total number of write ports in the total register file structure. Writes are fully broadcast so that all of the separate and individual register files are coherent.

The media functional units 220 are multiple single-instruction-multiple-data (MSIMD) media functional units. Each of the media functional units 220 is capable of processing parallel 16-bit components. Various parallel 16-bit operations supply the single-instruction-multiple-data capability for the processor 100 including add, multiply-add, shift, compare, and the like. The media functional units 220 operate in combination as tightly coupled digital signal processors (DSPs). Each media functional unit 220 has a separate and individual sub-instruction stream, but all three media functional units 220 execute synchronously so that the sub-instructions progress lock-step through pipeline stages.

The processor 100 supports full bypasses between the first two execution units within the media processing units 110 and 112 and has a scoreboard in the general functional unit 222 for load operations so that the compiler does not need to handle nondeterministic latencies due to cache misses. The processor 100 scoreboards long latency operations that are executed in the general functional unit 222, such as a reciprocal square-root operation, to simplify scheduling across execution units. The scoreboard (not shown) operates by tracking a record of an instruction packet or group from the time the instruction enters a functional unit until the instruction is finished and the result becomes available. The scoreboard provides a hardware interlock to stall instructions, if necessary. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlock conditions between the general functional unit 222 and the media functional units 220. All loads and non-pipelined long-latency operations of the general functional unit 222 are scoreboarded. The long-latency operations include division idiv, fdiv instructions, reciprocal square root frecsqrt, precsqrt instructions, and power ppower instructions. None of the results of the media functional units 220 is scoreboarded. Non-scoreboarded results are available to subsequent operations on the functional unit that produces the results following the latency of the instruction.

Figure 3:
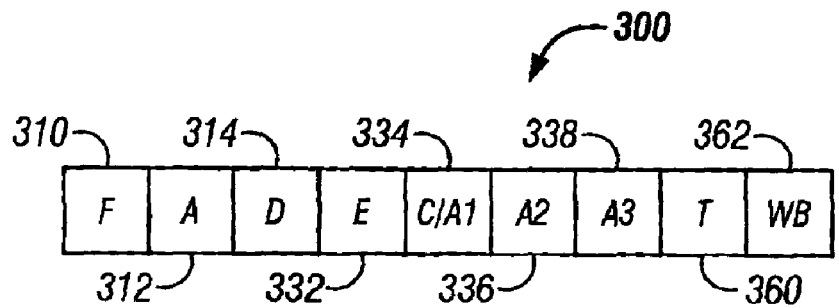
FIG. 3 is a schematic timing diagram illustrating one embodiment of a dedicated load/store pipeline.

FIG. 3 illustrates that processor 100 maintains a dedicated load/store pipe 300 for processing load and store memory operations. FIG. 3 is a schematic timing diagram illustrating one embodiment of the dedicated load/store pipe 300. The load/store pipe 300 includes nine sequential stages, including three initiating stages, a plurality of execution stages, and two terminating stages.

Referring to FIGS. 2 and 3, the operation of the GFU load/store pipe 300 is controlled by the Pipe Control Unit (PCU) 226. The first of the initiating stages of the load/store pipeline 300 is a fetch stage 310 (F stage). During the F stage 310, the processor 100 fetches instructions from the instruction cache 210. The fetched instructions are aligned in the instruction aligner 212 and forwarded to the instruction buffer 214 during an align stage 312 (A stage), a second stage of the initiating stages.

In a third stage of the initiating stages, decoding stage 314 (D stage), the PCU 226 decodes the fetched and aligned instruction out of the instruction packet. During the D stage 314 the PCU 226 sends information concerning the current load instruction to the load/store unit (LSU) 218. The four register file segments 224 each hold either floating-point data or integer data. The register file 216 is read in the decoding (D) stage 314.

Also during the D stage 314, the scoreboard (not shown) is read and updated. The scoreboard is a structure with information concerning unfinished loads. It provides a hardware interlock between any unfinished load operation and a younger instruction that has data/output dependency with the unfinished load operation. When a new instruction enters the D stage 314, it compares its source and destination register operands with all of the scoreboard entries. The number of entries in the scoreboard allocated for unfinished loads is equal to the number of entries in the load buffer 400 (FIG. 4) of the LSU, described below. In at least one embodiment, the scoreboard contains 5 load instruction entries. Each scoreboard entry for a load instruction has a 5-bit stage field that indicates how old the unfinished instruction is. This stage field is similar to the load buffer status word 410 (FIG. 4) discussed below. The stage bits are shifted right by one position as each pipeline stage executes. If a trap is detected before the load instruction's stage field indicates the WB stage 362 (1B'0000'), then the scoreboard entry is invalidated.

Following the decoding stage 314, the execution stages are performed. In the first execution stage, the E stage 332, the GFU 222 calculates the address of each load and store instruction. Also during the E stage 332, any load and store instruction in the instruction packet is sent to the load/store unit (LSU) 218 for execution. In at least one embodiment, each packet contains only one load or store instruction.

Figure 4:
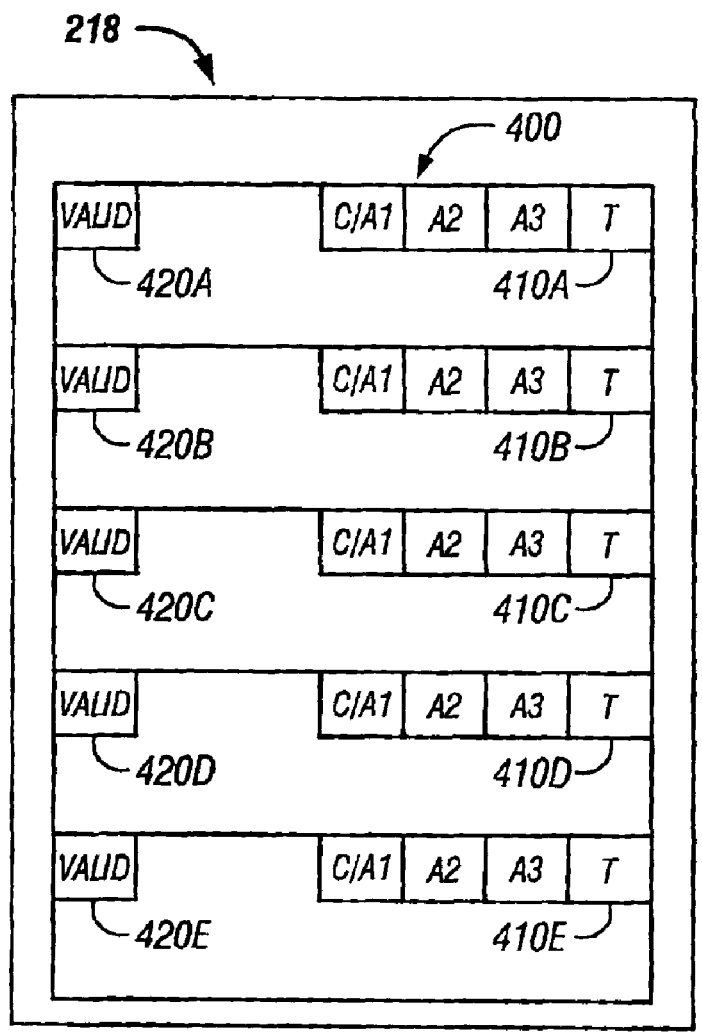
FIG. 4 is a block diagram of at least one embodiment of a load/store unit.

Referring to FIGS. 3 and 4, processing of load instructions during the remaining pipeline stages 334, 336, 338, 360, 362 is handled as follows. From the E stage 332 forward to the T stage 360, the LSU 218 keeps track of the load instruction's age. When forwarded to the LSU 218 in the E stage 332, the load instructions are placed into the load buffer 400 of the LSU. In at least one embodiment, the load buffer 400 has five entries and is therefore capable of maintaining up to five load instructions. Five entries are required because, in at least one embodiment, processor 100 allows one hit under four misses (described immediately below). In order to achieve this, 5 load entries are supported in the load buffer 400, and five load entries are supported by the scoreboard, described above.

Regarding a "hit under miss," reference is made to FIG. 2. When the LSU 218 attempts to access an item of information requested in a load operation, the item is either already present in the data cache 106 or not. If present, a cache "hit" has occurred. If the item is not in the data cache 106 when requested by the LSU 218, a cache "miss" occurs. After a cache miss occurs, the information requested by the LSU 218 must then be retrieved from memory and brought into the data cache 106 so that it may be accessed by the LSU 218. This search for an item of information that is not stored in the data cache 106 after a cache miss is a relatively time-consuming process. Processor 100 allows for a later-submitted load instruction that "hits" to obtain information from the data cache 106 before an earlier submitted load instruction that suffers a cache miss. This situation is referred to as a "hit under miss."

FIGS. 2, 3, and 4 relate to load instruction processing during the execution stages of the load/store pipe 300. Along with each load instruction, the LSU 218 keeps track of whether or not the instruction is valid and the load instruction's pipeline age. The valid bit 420 indicates that the load instruction has not been canceled due to a trap. In other words, resetting the valid bit effectively cancels the load instruction. The age information is kept in a status word 410. Each status word 410A, 410B, 410C, 410D, and 410E includes four stage bits, each stage bit corresponding to one of the C/A1, A2, A3, or T pipeline stages. The LSU 218 detects the transition from one pipeline stage to the next and, upon each transition, shifts the stage bits to the right by one position. The age of a load instruction is tracked in the status word 410 as indicated below in Table 1.

TABLE 1

| Stage Bits | C | A2 | A3 | T |
|---|---|---|---|---|
| C stage | 1 | 0 | 0 | 0 |
| A2 stage | 0 | 1 | 0 | 0 |
| A3 stage | 0 | 0 | 1 | 0 |
| T stage | 0 | 0 | 0 | 1 |

The LSU 218 accesses the data cache 106 in the C/A1 stage 334 of the load/store pipeline 300. If the load hits the data cache 106, data returns from the data cache 106 and is forwarded to the PCU 226 in the same cycle. The LSU 218 also sends to the PCU 226 the status word 410 with the age of the load. In the case where the load hits the data cache 106 in the C/A1 stage 334, the status word will reflect a value of 1B'1000,' indicating that the age of the load corresponds to the C/A1 pipeline stage 334. On such a cache hit, load data returns to the PCU 226 during the same C/A1 stage 334 that the LSU 218 accessed the data cache 106. However, in order to ensure precise trap handling, the results from the hit cannot be written to the register file 216 until all other instructions in the instruction packet have completed. When a load hits in the C/A1 stage 334, its resultant data cannot be written to the register file 216 until the remaining execution stages have completed.

Similarly, the results of a non-load instruction must also be retained, and not broadcast to the register file 216, until the remaining execution stages have completed. For such instructions, the results of the instruction are not written to the register file until it has been determined in the T execution stage 360 whether a trap has occurred to prevent execution of the instruction. The staging of non-load instructions in an annex the through the T stage 360 is discussed in greater detail below in connection with the discussion of FIG. 6.

Regarding load instructions, if the load misses the data cache 106, the data returns from the LSU 218 to the PCU 226 only after the LSU 218 gets the data from the main memory interface 102 (FIG. 1). Thus, a load instruction remains in the load buffer of the LSU 218 until it retrieves its data. In contrast, all hits are transferred to the LDX 500 (FIG. 5).

Figure 5:
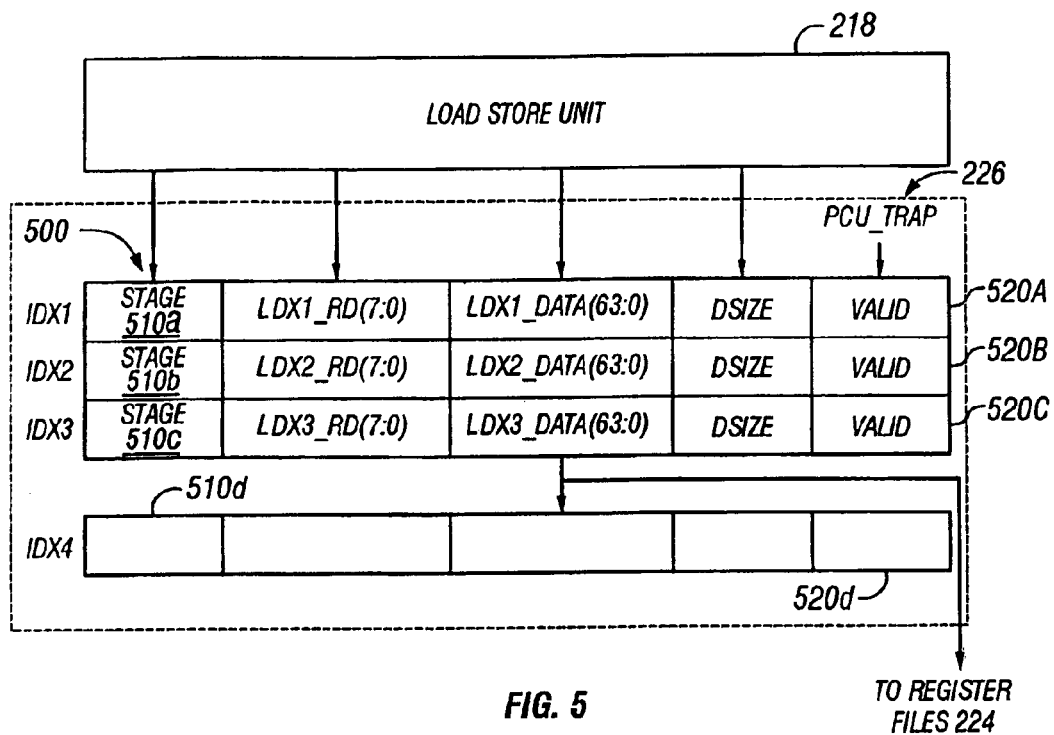
FIG. 5 is a schematic diagram illustrating a load/store unit and a pipe control unit that share information concerning load instructions.

Referring to FIGS. 3 and 5, after load data is received by the PCU 226, it is not immediately written to the register file segments 224. To do so might cause data incoherence in a machine that executes load instructions speculatively and out of order. Instead, the load data and associated load information enters a load annex (LDX) 500. Load data is staged in the LDX 500 for a sufficient number of cycles so that the load instruction can reach the T pipeline stage 360 before its data is broadcast to the register file segments 224. While load data is being staged in the LDX 500, the data is available to be bypassed to other functional units, as described below. The load data is broadcast to the register files in the WB stage 362 if no trap was detected. Traps are detected in the T pipeline stage 360.

In at least one embodiment, the load data is staged in the LDX 500 for three stages before being broadcast to the register file segments 224. By staging the load data in the LDX 500 for three cycles, all the precise exceptions caused by either the load instruction itself or other instructions in the same or an older instruction packet as the load instruction will cause the load instruction to be canceled. That is, if a trap is detected before the load instruction reaches the WB stage 362, the valid bit for the load instruction is reset. When the load data is broadcast to the register files 224, the register files 224 latch the data locally and update the registers in the next clock cycle.

FIG. 5 illustrates that LDX 500 contains four entries labeled ldx1, ldx2, ldx3, and ldx4. These LDX entries act as a FIFO queue, with newer load data from the LSU 218 being placed in ldx1, and older load data being written to the register file 224 from ldx4. The register files 224 have a dedicated write port for load instructions, so the load data is shifted down one entry in the FIFO LDX 500 each clock cycle. Because the LDX 500 entries act as a FIFO queue, one may assume that load data contained in an entry corresponding to a lower index number has the freshest data for its destination register. That is, in terms of determining which LDX entry has the freshest data for a particular destination register, if two entries have data for the same destination register, the freshest data value will be the value contained in the lower-index entry.

FIG. 5 further illustrates that the LDX 500 includes four entries ldx1, ldx2, ldx3, and ldx4 even though the load data is only staged for three cycles. The fourth entry ldx4 is used to write the load data to the register files 224. Because load data cannot be accessed in the same cycle that it is being written to the register files 224, the additional ldx4 entry holds the load data while it is being written.

Each LDX entry ldx1, ldx2, ldx3, and ldx4 includes a stage field 510. This stage field 510 is derived from the value of the load buffer status word 410 associated with the LDX entry when it enters the PCU 226. The value of the stage field 510 indicates the age of the load instruction in the LDX entry. When the status word 410 for a particular load instruction is forwarded to the LDX 500, the C/A1 stage is no longer relevant. Instead, the load data was received by the LDX 500, at the earliest, during the C/A1 phase, so the LDX 500 need only track the age of the particular load instruction through the A2, A3, and T stages to ensure that the data from load instructions that hit in the data cache 106 are not written to the register files 224 until the particular load instruction has completed the T stage. The stage bits in the four-bit status word 410 for the particular load instruction are therefore shifted right by one bit and the stage bits corresponding to the A2, A3, and T stages are placed in the 3-bit stage field 510 of the LDX entry associated with the particular load instruction. The PCU 226 detects the transition from one pipeline stage to the next. Upon each such transition, the PCU 226 shifts the stage bits in the stage field 510 to the right by one bit position. Because only one stage bit, at the most, is set for a load instruction at any one time, shifting to the right effectively resets the stage bit for the last stage and sets the stage bit for the current stage. The values of the stage field 510 for each pipeline stage that the LDX tracks is set forth below in Table 2.

TABLE 2

| Stage | Description |
| --- | --- |
| 1B'100' | Load data in A2 stage |
| 1B'010' | Load data in A3 stage |
| 1B'001' | Load data in T stage |
| 1B'000' | Load data in WB or after WB stage |

Table 2 illustrates that the sequential shift-right scheme for each successive transition from one pipeline stage to the other has the effect that all stage bits are reset for the WB stage 362 and any stages that occur after the load instruction has reached its WB stage 362. If a trap is detected before a load instruction reaches the WB stage 362, the load instruction is invalidated. In at least one embodiment, the valid bit 520 in the LDX entry is reset by the pcu_trap signal that indicates that the PCU 226 has detected a trap. Accordingly, the stage bits are useful in the scheme for invalidating load instructions when a trap occurs.

Each LDX entry ldx1, ldx2, ldx3, ldx4 also includes a dsize field. The dsize field indicates whether the data associated with the load instruction is a 64-bit data word or a 32-bit data word.

The next two execution stages following the C/A1 stage 334, the A2 stage 336 and the A3 stage 338, are additional execution stages. For load instructions that have accessed the data cache 106 and returned their data during the C/A1 stage 334, the data is staged in the LDX 500 during the A2 and A3 stages 336, 338, respectively. The presence of trap conditions are detected by the PCU 226 in the T stage 360 of the load/store pipeline 300. For load instructions that do not return their data during the C/A1 stage 334 (i.e., a cache "miss"), a scoreboard hardware interlock stalls subsequent instructions with data dependencies on that load instruction.

FIG. 5 illustrates that the two terminating stages of the load/store pipe 300 include a trap-handling stage 360 (T stage) and a write-back stage 362 (WB stage) during which result data is written-back to the register file 224 (FIG. 2). Processing of a load instruction during each of these stages is discussed in detail below.

FIGS. 3, 4, and 5 illustrate that, if the PCU 226 detects a trap, it generates a trap signal pcu_trap. This signal is used during the T stage 360 to reset the "valid" bit in the LDX entries for load instructions that are younger than the trapping instructions. In addition, the PCU 226 sends the pcu_trap signal to the LSU 218, and the LSU 218 then resets its valid bits 420A, 420B, 420C, 420D, 420E for any load instructions in the load buffer 400 that are younger than the trapping instruction. In the LDX 500, the load instruction will only be invalidated if it has not reached the WB stage 362 by the time the trap is detected. In other words, any load instruction that has reached the WB stage 362 may be written to the register files 224, regardless of its age, since it obviously was not canceled before or during the trap stage of its pipeline. During the WB stage 362, data from the T stage 360 of the load store/store pipeline 300 is broadcast to the register files 224. The register files 224 latch the data in WB stage 362 flip-flop latches (not shown) before writing the data.

Figure 6:
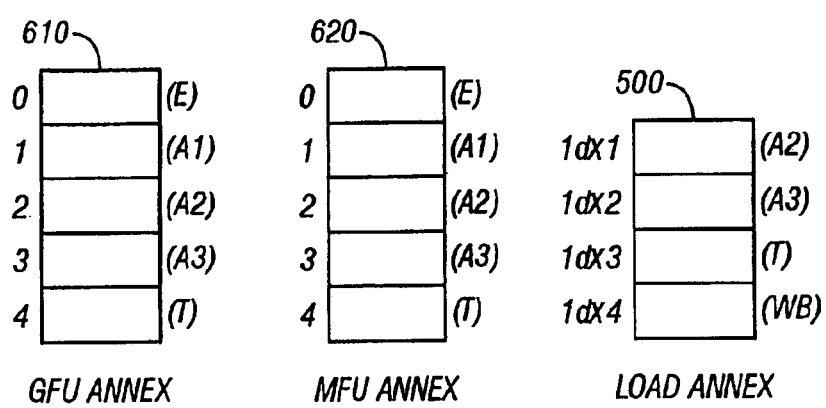
FIG. 6 is a block diagram illustrating a GFU non-load annex, an MFU non-load annex, and a load annex.

FIGS. 2 and 6 illustrate that GFU and MFU instructions are staged in an annex for a sufficient number of cycles so that the instruction can reach the T pipeline stage 360 (FIG. 3). GFU instructions are staged in a GFU annex 610. MFU instructions are staged in an MFU annex 620. Although only one MFU annex 620 is illustrated in FIG. 6, one skilled in the art will recognize that one MFU annex 620 is necessary for each MFU unit 220. Therefore, in an embodiment such as that illustrated in FIG. 2, each MPU 110, 112 contains three MFU annexes 620, each of the three MFU annexes 620 corresponding to one of the three MFU's 220.

The five entries of the GFU annex 610 and MFU annex 620 represent the five potential pipeline stages during which a non-load instruction can return from execution and be staged before the WB execution stage 362 (FIG. 3). If a non-load instruction returns to the annex during the A2 stage 336 (FIG. 3), it is entered into the entry of the appropriate annex 610, 620 at index 2. Similarly, a non-load instruction that returns to the annex during the E stage 332 (FIG. 3) is entered at index 0 of the appropriate annex 610, 620. In this manner, the index location of an instruction indicates its "pipeline age."

Within a non-load annex, it is relatively easy to determine which entry holds the latest data for a destination register, even when more than one entry modifies the same destination register. This is because the annexes 610, 620 operate as a FIFO queue. Therefore, of multiple entries within a particular annex, the entry with the lowest index value has newer data for a destination register than an entry with the same destination register that has a higher index value.

An instruction stored at index 0 was issued by the processor more recently than instructions stored at indices 1 through 4. Similarly, an instruction stored at index 2 was issued by the processor more recently than those stored at indices 3 and 4, but not as recently as those stored at indices 0 and 1. Accordingly, the pipeline age of an instruction staged in the GFU annex 610 or an MFU annex 620 can be determined solely from its position within the annex. Entries in the GFU annex 610 and the MFU annex 620 are shifted to the next-higher index position upon each successive cycle.

When an instruction is staged in an annex 610, 620, certain information identifying the instruction and the data generated by execution of the instruction is held in the annex entry. One such piece of information is the value of the data to be stored in the destination register ("rd"). For purposes of discussion, two exemplary destination registers will be referred to herein as "rd a" and "rd b." While an instruction ("older instruction") is staged in an annex 610, 620, its destination register value is not broadcast to the register files 224, in order to allow for precise trap handling. Nonetheless, while the older instruction is staged in an annex 610, 620, the data generated in the destination register of the older instruction is made available to younger instructions that are dependent on data. This availability is sometimes referred to herein as "bypass."

In order to facilitate the following discussion, it should be noted that, in at least one embodiment, a VLIW instruction packet contains one GFU instruction followed by three MFU instructions (that is, one MFU instruction for each of the three MFU's 220 in the MPU 110, 112). In at least one embodiment, a GFU instruction can be performed on any of the functional units 220, 222, whereas an MFU instruction can be performed only on an MFU 220 but not on a GFU 222. In at least one embodiment, examples of GFU instructions include ADD, ST(ore), DIV(ide), SH(ift), MUL(tiply), and SUB(tract). In at least one embodiment, examples of instructions that can only be performed on an MFU 220 include dot-product with add, dot-product with subtract, maximum floating point value, arithmetic mean parallel, minimum floating point value, and move conditional parallel.

Figure 7:
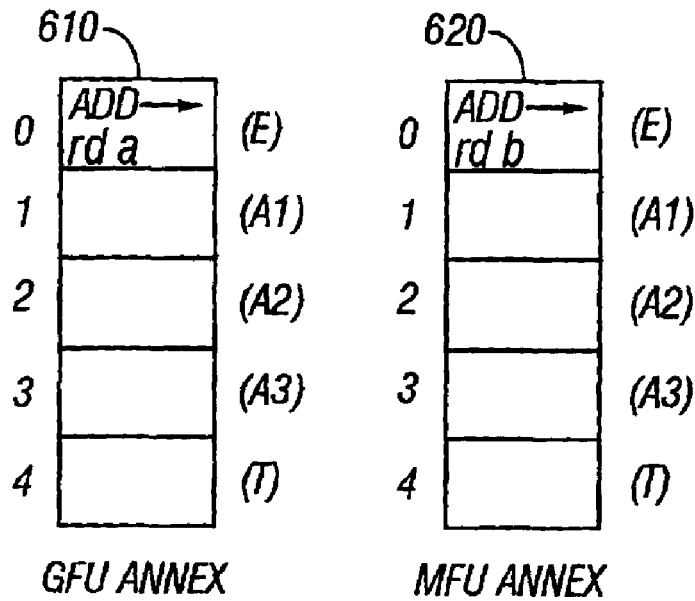
FIG. 7 is a block diagram illustrating the contents of a GFU annex and an MFU annex containing data corresponding to non-load instructions having different destination registers.

Reference to FIG. 7 is made for a discussion of non-load bypass. For the moment, bypass operation from instructions staged only in a GFU annex 610 or MFU annex 620 is discussed herein. (Bypass from the load annex (LDX) 500 is discussed in further detail below). Bypass from the GFU annex 610 and the MFU annex 620 is facilitated by a system requirement that mandates that no two annex entries among all the annexes will have the same pipeline age and the same destination register. That is, among all non-load annexes 610, 620, only one entry per index is permitted for a particular destination register.

For instance, FIG. 7 illustrates that an add instruction with destination register 'rd a' is staged at index 0 of the GFU annex 610. An add instruction with destination register 'rd b' is staged at index 0 of the MFU annex 620. This is permitted, since the two instructions are at the same index level but have different destination registers. It would not be permitted, however, for index entry 0 for MFU annex 620 to contain an instruction entry having 'rd a' as the destination register if an index entry 0 for any of the other MFUs or for the GFU already contained an instruction entry having 'rd a' as the destination register.

The non-load annexes 610, 620 operate as a FIFO queue. The position-dependent pipeline age indication within the MFU and GFU annexes, 610 and 620, respectively, facilitates a priority scheme. That is, if an annex entry has the destination register desired for bypass, its "priority" can be determined, based on its pipeline age, from its position within the index. An entry at index 0 for any annex 610, 620 is of the highest priority because it is, by necessity, the most recent value in the annex for that destination register. A priority scheme is thus devised as follows. An entry at index 0 for any annex 610, 620 corresponds to the E stage and is a "level 1" priority. An entry at index 1 for any annex 610, 620 corresponds to the A1 stage and is a "level 2" priority. An entry at index 2 for any annex 610, 620 corresponds to the A2 stage and is a "level 3" priority. An entry at index 3 for any annex 610, 620 corresponds to the A3 stage and is a "level 4" priority. An entry at index 4 for any annex 610, 620 corresponds to the T stage and is a "level 5" priority. This priority scheme is for non-load instructions. The priority scheme for load instructions stored in the load annex 500 is discussed below.

Figure 8:
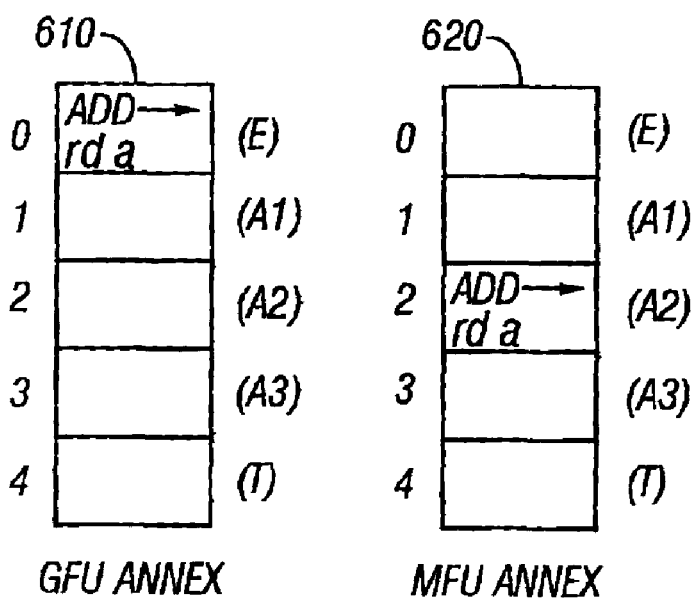
FIG. 8 is a block diagram illustrating the contents of a GFU annex and an MFU annex containing data corresponding to non-load instructions having the same destination register.

FIG. 8 provides a further example of non-load bypass. An add instruction with destination register 'rd a' is staged at index 0 of the GFU annex 610. An add instruction with destination register 'rd a' is staged at index 2 of the MFU annex 620. This is permitted, even though the two instructions have the same destination register, since the two instructions are at the different index levels (i.e., 0 and 2). In the example illustrated in FIG. 8, one can easily determine, based on the FIFO nature of the annexes, that the entry in GFU annex 610 at index 0 has a more recent value for 'rd a' than the MFU annex 620 entry at index 2. Accordingly, the entry in GFU annex 610 at index 0 has a higher bypass priority than the MFU annex 620 entry at index 2.

In a bypass scheme, it is therefore relatively easy and inexpensive to determine that, for the example illustrated in FIG. 8, the value of 'rd a' should be bypassed to a younger instruction from the index 0 entry of the GFU annex 610 rather than the index 2 entry of the MFU annex 620. Because the index value is lower for the GFU annex 610 entry (i.e., the index is 0 instead of 2), it has a more recent value for the contents of 'rd a', and therefore has a higher bypass priority. As the discussion below indicates, however, the bypass scheme becomes more complicated when a load annex 500 (FIG. 5) is considered.

Regarding load instructions, while a load instruction is staged in the load annex 500, its load data is also made available to younger load instructions even though its load data has not yet been broadcast to the register files 224. As is discussed above, the same is true for data stored in the other annexes 610, 620. A robust bypass scheme must therefore determine, if entries in multiple annexes 610, 620, 500 modify the same destination register, which entry has the most recent information for that register. Only the most recent, or "freshest," data should be bypassed to younger instructions.

In at least one embodiment, the load annex (LDX) 500 does not support the same position-dependent age calculation that is supported by the GFU annex 610 and MFU annex 620. This is due to the fact that, if the load misses the data cache 106 (FIG. 1), the data returns from the LSU 218 to the PCU 226 only after the LSU 218 gets the data from the main memory interface 102 (FIG. 1). Thus, a load instruction remains in the load buffer of the LSU 218 until it retrieves its data. After a hit, all loads are transferred to the LDX 500. A load instruction can execute in a relatively few cycles if there is a cache hit. However, if there is a cache miss, the load instruction can take a relatively large number of cycles to execute before the load data is staged in the load annex 500. Accordingly, unlike the GFU and MFU annexes 610, 620, the load annex 500 may contain load data for instructions which are not in program order. Nonetheless, the operation of the scoreboard ensures that load data for load instructions that have the same destination register are stored in program order.

Nonetheless, a priority scheme can be devised for the LDX 500 when one recognizes the effect of the scoreboard hardware interlock discussed above. FIG. 9 is a block diagram illustrating the relative pipeline execution stages for a series of instructions having the same destination register, 'rd a.' For purposes of example, assume that a series of five sequential instructions all have the same destination register as follows:

(1) load->rd a (2) add->rd a (3) add rd a, rd b, rd a (4) add rd a, rd b, rd a (5) add rd a, rd b, rd a After the load instruction (1) is decoded in cycle 1, then the add instruction (2) is decoded in cycle 2. Without bypass functionality, the add instruction (2) must stall until the load instruction (1) has reached the WB stage before the contents of register rd a are available for the add instruction (2) to use.

FIG. 9 illustrates that, assuming that the load instruction (1) has a cache hit, the load instruction returns its load data in cycle 3, during the C/A1 stage. Hardware intercepts and stalls instructions that try to use results produced by a previous instruction when those results are not yet ready. Accordingly, FIG. 9 illustrates that, due to the hardware interlock, the add instruction (2) stalls in the D stage during cycles 3 and 4. With bypass functionality the add instruction (2) thus only stalls for two cycles, rather than stalling until the load instruction (1) has reached the WB stage.

FIGS. 9 and 10 illustrate that, when the results from the load instruction (1) are staged in ldx1, there is no younger (more recently issued) instruction with the same rd specifier as the load instruction (1) in any annex, due to the hardware interlock. The add instruction (2) is unstalled in cycle 4, during which the result of the load instruction is staged in the load annex 500 in entry ldx1. FIG. 9 illustrates that the load data from the load instruction (1) is therefore available in the LDX 500 beginning in cycle 4, even though the register files won't be updated until cycle 7 (in order to support precise exceptions).

Thus, if a load instruction is followed by a GFU or MFU instruction with the same destination address specifier ("the younger instruction"), then the earliest the younger instruction can enter the E stage is when the load instruction is in the ldx1 stage of the load annex 500. Thus, no other instruction in any other annex 610, 620 has load data for the rd a destination register younger than the ldx1 data, due to the scoreboard hardware interlock. Similarly, the scoreboard hardware interlock ensures that no entry in the load annex 500 having the same destination register is younger than the load (1) that is in the ldx1 stage. Hence, load data in the ldx1 stage is always the youngest load data for its destination register in the load annex 500, and it is therefore assigned the highest priority, indicating that it is the most up-to-date data for the destination register. An entry of the load annex 500 in the ldx1 stage corresponds to the level 1 priority assigned to index 0 (i.e., E pipeline stage) for GFU and MFU annexes 610, 620.

FIGS. 9 and 11 illustrate that, in cycle 5, the add instruction (2) that was unstalled in cycle 4 is now in its E stage. The add instruction (3) is in its D stage and the load data for load instruction (1) is in the ldx2 stage. For the add instruction (3), it must be determined which of the two annex entries in FIG. 11 is to be used for bypass of the contents of rd a. FIGS. 9 and 11 illustrate that, in cycle 5, the only result for rd a that is both 1) available for bypass and 2) younger than the load data in ldx2 is the E-stage entry for the add instruction (2) that is stored in the MFU annex 620. (One skilled in the art will recognize that the add instruction is used for example only, and the same is true for any MFU/GFU instruction that is not a long-latency instruction). Hence, results in the ldx2 entry of the load annex 500 are one level lower in priority than entries in the E-stage entries of a GFU annex 610 or an MFU annex 620. An entry of the load annex 500 in the ldx2 stage therefore corresponds to the level 2 priority assigned to index 1 (i.e., A1 pipeline stage) for GFU and MFU annexes 610, 620. The second level of priority thus includes MFU/GFU instructions in an annex 610, 620 entry at index 1 (i.e., A1 pipeline stage) as well as the entry at the ldx2 level of the load annex 500.

Figure 12:
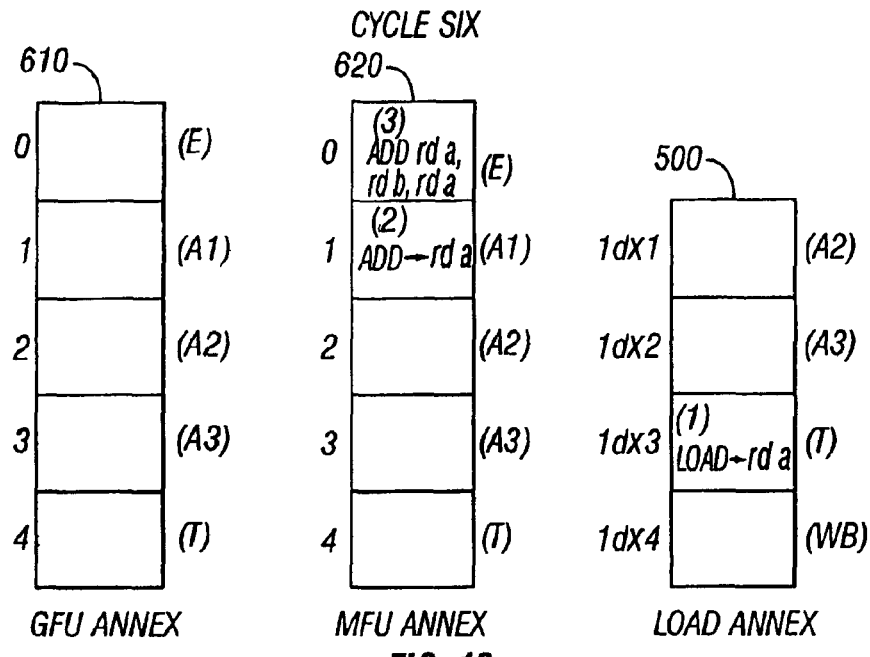
FIG. 12 is a block diagram illustrating the contents of a load annex and an MFU annex containing data associated with successive load and non-load instructions having the same destination register.

FIGS. 9 and 12 illustrate that in cycle 6 the load instruction (1) is in the ldx3 entry of the load annex 500. Add instruction (2) is in the A1 stage and add instruction (3) is in the E stage. [While instructions (2) and (3) are illustrated as being staged in an MFU annex, add instructions can be executed, in a preferred embodiment of the present invention, by either the GFU or by the first MFU. Load instructions are GFU instructions. Accordingly, instructions (2) through (5) can be staged in either the GFU annex 610 or the MFU annex 620, assuming that the MFU annex 620 corresponds to the first of a plurality of MFU units.] FIGS. 9 and 12 further illustrate that add instruction (4) is in the D stage. The annex entries representing instructions with the same rd specifier but issued later than the load instruction (1) are the E (index 0) and A1 (index 1) entries of the MFU annex 620. Hence, results in the ldx3 entry of the load annex 500 are one level lower in priority than entries in the A1-stage entries of an GFU annex 610 or MFU annex 620. An entry of the load annex 500 in the ldx3 stage therefore corresponds to the level 3 priority assigned to index 2 (i.e., A2 pipeline stage) for GFU and MFU annexes 610, 620. The third level of priority thus includes MFU/GFU instructions in an annex 610, 620 entry at index 2 (i.e., A2 pipeline stage) as well as the entry at the ldx3 level of the load annex 500.

Similar observations for lower-level bypass priorities can also be made, as shown below in Table 3. For instance, results in the ldx4 entry of the load annex 500 are one level below the A2 stage of the MFU/GFU instructions and are therefore assigned to level 4 priority along with MFU/GFU instructions in an annex 610, 620 entry at index 3 (i.e., A2 pipeline stage). Level 1 has a higher priority than Level 2, and so on. Among the stages in the same level, there is no priority scheme necessary because only one match can occur at any level.

TABLE 3

| Level | GFU/MFU Annex Stage | LDX Annex Stage |
|---|---|---|
| 1 | E | ldx1 |
| 2 | A1 | ldx2 |
| 3 | A2 | ldx3 |
| 4 | A3 | ldx4 |
| 5 | T | n/a |
| 6 | WB | n/a |

By recognizing the priority set forth in Table 3, all the annex entries in the same priority level can be grouped together, and the data can be bypassed from the entry having the highest priority. One skilled in the art will recognize that additional priority levels can be devised for processors that have additional pipeline stages. For instance, in at least one embodiment a level 7 priority corresponds to a stage wherein a read of the register file is performed.

Figure 13:
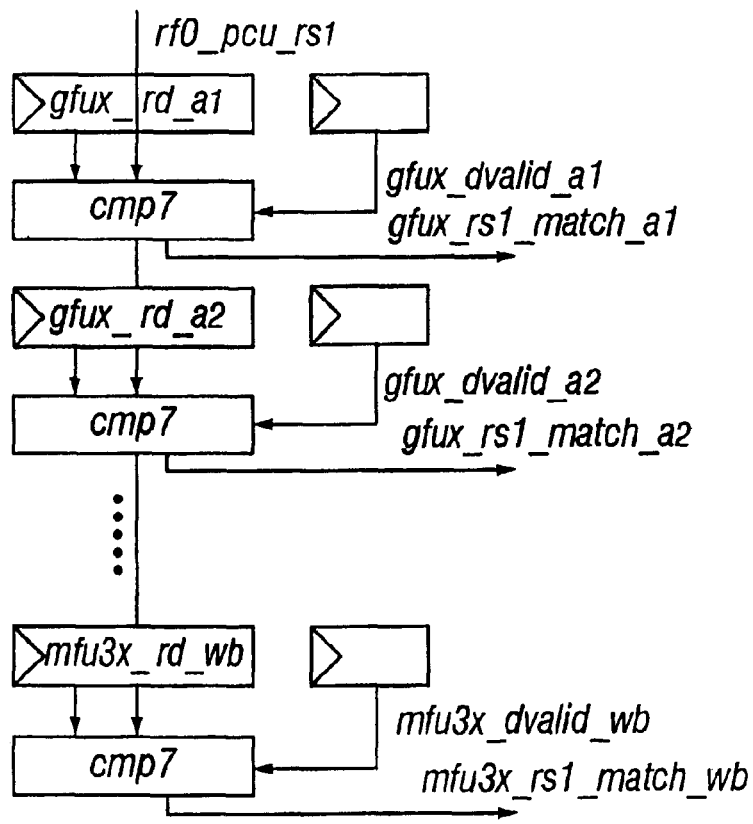
FIG. 13 is a block diagram of a module that performs comparison and match-notification logic.

FIG. 13 illustrates one embodiment of a module that performs the priority-based comparisons to determine which annex entry should be used for bypass to a younger instruction (referred to herein as the "current" instruction). While FIG. 13 represents a preferred embodiment of a hardware module, one skilled in the art will recognize that the functionality illustrated in FIG. 13 can also be implemented in software, firmware, or a combination of hardware, software, and/or firmware.

FIG. 13 illustrates that the module is configured to identify which, if any, of a plurality of non-load annex entries has a match with a source register for the current instruction. A similar module (not shown) uses the same logic scheme to identify which, if any, of a plurality of load annex entries has a match with the desired source register.

FIGS. 13 and 6 illustrate that a data value representing the source register of interest, rf0_pcu_rs1, is presented to a plurality of comparison elements, cmp7. There is one comparison element cmp7 for each of the plurality of entries in each of the annexes. For instance, the comparison element for a first entry in the GFU annex 610 compares the contents of the annex entry, gfux_rd_a1 to the signal rfu_pcu_rs1 to determine whether a match is detected (i.e., the annex entry contains a value associated with the register of interest). Similarly, rf0_pcu_rs1 is compared to each of the remaining entries in the GFU annex 610 to determine whether a match is detected. Accordingly, FIG. 13 illustrates that the scheme performs a comparison for each entry (E, A1, A2, A3, and T) of the GFU annex 610 as well as each entry (E, A1, A2, A3, and T) for each of the one or more MFU annexes 620. For instance, signal mfu3x_rd_wb represents the lowest-priority entry (T) for the nth MFU annex 620, where the computer system includes n processors and therefore n associated MFU annexes 620.

Although not shown, similar logic is performed for each entry of the load annex 500. FIG. 13 illustrates that each entry of each annex is evaluated to generate a match signal. If a match is detected, the "freshest" value is determined by evaluating which of the match signals comes from the highest priority level as shown in Table 3. The "freshest" value is then provided for execution of the current instruction.

That is, if no match for the register of interest is found in a Level 1 priority entry, then the Level 2 priority entries are checked, and so on until a match, if any, is encountered. In this manner, bypass occurs from the annex entry with the highest priority (i.e., the lowest Level number) and, hence, the freshest data for a particular register is bypassed to the current instruction.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. In a microprocessor that manages interlock conditions for load instructions and that supports speculative and out-of-order execution of load instructions, a method of bypassing data to younger instructions, comprising:

identifying a source register upon whose contents a current instruction depends for execution;

providing a load annex, the load annex having a plurality of sequential load entries, each of the plurality of sequential load entries being capable of storing data associated with the source register, wherein each load entry is associated with one of a plurality of sequential priority levels, the plurality of sequential priority levels comprising a highest priority level and a lowest priority level;

storing, in the sequential entries of the load annex, a plurality of load data associated with a particular register, wherein the plurality of load data associated with the particular register are stored in program order with respect to each other;

providing a non-load annex, the non-load annex having a plurality of non-load entries, each of the plurality of non-load entries being capable of storing data associated with the source register, wherein each entry of the non-load annex is associated with one of the plurality of sequential priority levels;

providing that, at most, only one among the load entry associated with a particular priority level and the non-load entry associated with the particular priority level contains a value associated with the source register;

locating, among the plurality of load annex entries and the plurality of non-load annex entries, a freshest value associated with the source register; and providing the freshest value for use in execution of the current instruction.

2. The method recited in claim 1, wherein locating a freshest value further includes:

determining whether any annex entry associated with the highest priority level contains a value associated with the source register, and, if so, selecting the value in the annex entry associated with the highest priority level as the freshest value; and determining, if no annex entry is associated with the highest priority level, whether any annex entry associated with the lowest priority level contains a value associated with the source register, and, if so, selecting the value in the annex entry associated with the lowest priority level as the freshest value.

3. The method recited in claim 1, wherein:

the plurality of priority levels includes at least one intervening level between the highest priority level and the lowest priority level.

4. The method recited in claim 3, wherein locating a freshest value further includes:

determining whether an annex entry associated with the highest priority level contains a value associated with the source register, and, if so, selecting the value in the entry associated with the highest priority level as the freshest value;

if not, sequentially determining whether an annex entry associated with successively lower priority levels lower than the highest priority level contains a value associated with the source register, selecting as the freshest value the value associated with the source register from the annex entry with the highest of the lower priority levels.

5. The method recited in claim 1, further comprising:

providing a plurality of non-load annexes.

6. A computer system that bypasses load data to younger instructions, comprising:

a main memory;

at least one processing unit coupled to the main memory, the processing unit, being configured to execute load instructions and also being configured to execute a current instruction, having a source register;

a load annex, the load annex having a plurality of sequential load entries, each of the plurality of sequential load entries being capable of storing data associated with the source register, wherein each load entry is associated with one of a plurality of sequential priority levels, the plurality of sequential priority levels comprising a highest priority level and a lowest priority level;

a scoreboard that manages interlock conditions for the load instructions executed by the processing unit, wherein the scoreboard further comprises a module that permits execution of a plurality of load instructions having the same destination register, wherein the plurality of load instructions having the same destination register are executed in program order with respect to each other;

a non-load annex, the non-load annex having a plurality of non-load entries, each of the plurality of non-load entries being capable of storing data associated with the source register, wherein each entry of the non-load annex is associated with one of the plurality of sequential priority levels;

a module, coupled to the main memory, that provides for locating, among the plurality of load annex entries and the plurality of non-load annex entries, a freshest value associated with the source register; and a module that is operable to provide the freshest value for use in execution of the current instruction.

7. The computer system recited in claim 6, wherein:

the module that provides for locating a freshest value further includes:

a module that is operable to determine whether any annex entry associated with the highest priority level contains a value associated with the source register, and, if so, is further operable to select the value in the annex entry associated with the highest priority level as the freshest value; and a module that is operable to determine, if no annex entry is associated with the highest priority level, whether any annex entry associated with the lowest priority level contains a value associated with the source register, and, if so, is further operable to select the value in the annex entry associated with the lowest priority level as the freshest value.

8. The computer system recited in claim 6, wherein:

the plurality of priority levels includes at least one intervening level between the highest priority level and the lowest priority level.

9. The computer system recited in claim 8, wherein:

the module that provides for locating a freshest value further includes:

a module that is operable to determine whether an annex entry associated with the highest priority level contains a value associated with the source register, and, if so, is further operable to select the value in the annex entry associated with the highest priority level as the freshest value; and a module that is operable, if no annex entry associated with the high priority level contains a value associated with the source register, to sequentially determine whether an annex entry associated with successively lower priority levels contains a value associated with the source register, and, if an entry at one or more priority levels lower than the highest priority level contains a value associated with the source register, is operable to select as the freshest value the value associated with the source register from the annex entry with the highest of the lower priority levels.

10. The computer system recited in claim 6, further comprising:

a plurality of non-load annexes, each of the plurality of non-load annexes having a plurality of non-load entries, each of the plurality of non-load entries being capable of storing data associated with the source register, wherein each entry of each non-load annex is associated with one of the plurality of sequential priority levels.

11. A computer system, comprising:

a main memory;

at least one processing unit coupled to the main memory, the processing unit, being configured to execute load instructions and also being configured to execute a current instruction, having a source register;

means for identifying the source register upon whose contents a current instruction depends for execution;

means for storing a plurality of load data associated with the source register wherein each load data is associated with one of a plurality of sequential priority levels, the plurality of sequential priority levels comprising a highest priority level and a lowest priority level;

means for storing a plurality of load data associated with a particular register in program order with respect to each other;

means for storing a plurality of non-load data associated with the source register, wherein each non-load data is associated with one of the plurality of sequential priority levels;

means for providing that, at most, only one among the load data associated with a particular priority level and the non-load data associated with the particular priority level contains a value associated with the source register;

means for locating, among the plurality of load data and the plurality of non-load data, a freshest value associated with the source register; and means for providing the freshest value for use in execution of the current instruction.

12. The computer system recited in claim 11, wherein means for locating a freshest value further comprises:

means for identifying whether any load data or non-load data associated with the highest priority level contains a value associated with the source register, and, if so, selecting the identified data as the freshest value; and means for identifying, if no annex entry is associated with the highest priority level, whether any load data or non-load data associated with the lowest priority level contains a value associated with the source register, and, if so, selecting the identified data as the freshest value.

13. The computer system recited in claim 11, wherein:

the plurality of priority levels includes at least one intervening level between the highest priority level and the lowest priority level.

14. The computer system recited in claim 13, wherein means for locating a freshest value further includes:

means for identifying whether a load data or non-load data associated with the highest priority level contains a value associated with the source register, and, if so, selecting the identified data as the freshest value;

means for, if no load data or non-load data associated with the highest priority level contains a value associated with the source register, sequentially identifying whether a load data or non-load data associated with successively lower priority levels contains a value associated with the source register, and, if an entry at one or more priority levels lower than the highest priority level contains data associated with the source register, selecting as the freshest value the identified data associated with the highest among the lower priority level.

15. The computer system recited in claim 11, further comprising:

providing a plurality of means for storing a plurality of non-load data associated with the source register, wherein each non-load data is associated with one of the plurality of sequential priority levels.

* * * * *

UNITED STATES PATENT AND TRADEMARK OFFICE
CERTIFICATE OF CORRECTION

PATENT NO. : 6,928,534 B2
DATED : August 9, 2005
INVENTOR(S) : Sharada Yeluri

It is certified that error appears in the above-identified patent and that said Letters Patent is hereby corrected as shown below:

<u>Column 14,</u>
Line 37, the words "index 3 (i.e., A2" should read -- index 3 (i.e., A3 --.

Signed and Sealed this

Third Day of January, 2006

JON W. DUDAS
*Director of the United States Patent and Trademark Office*